Nov. 28, 1939.  H. A. SATTERLEE  2,181,155
VARIABLE SPEED MOTOR SYSTEM
Filed Jan. 19, 1939  2 Sheets-Sheet 1

INVENTOR.
HOWARD A. SATTERLEE
BY
ATTORNEY.

Nov. 28, 1939.   H. A. SATTERLEE   2,181,155
VARIABLE SPEED MOTOR SYSTEM
Filed Jan. 19, 1939   2 Sheets-Sheet 2

INVENTOR.
HOWARD A. SATTERLEE
BY
Ezekiel Wolf
ATTORNEY.

Patented Nov. 28, 1939

2,181,155

UNITED STATES PATENT OFFICE 2,181,155

VARIABLE SPEED MOTOR SYSTEM

Howard A. Satterlee, Needham, Mass., assignor to Submarine Signal Company, Boston, Mass., a corporation of Maine Application January 19, 1939, Serial No. 251,776

4 Claims. (Cl. 171—119)

The present invention relates to a system for controlling the speed of rotation of an electric motor.

In my copending application Serial No. 108,853, filed November 2, 1936, I have disclosed several arrangements for controlling the speed of rotation of a motor. These systems briefly include the use of a grid-controlled rectifier whose anode circuit, which contains in series the armature of the motor to be driven, is supplied from an alternating current source while the grid circuit of the rectifier is supplied with a direct current potential variable in accordance with the desired motor speed and opposed by a potential varying in proportion to the motor speed and being preferably the back E. M. F. of the motor.

According to the present invention the anode circuit of a grid-controlled rectifier is connected to a source of alternating potential to pass current through the armature of the motor to be controlled while the grid circuit of the rectifier is supplied with alternating potential derived from the same source and variable in magnitude in accordance with the desired motor speed.

Figure 1:
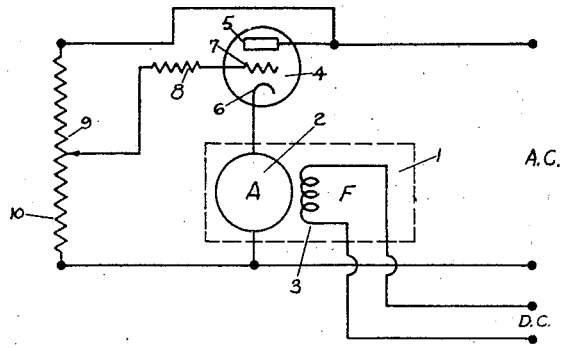
Figure 2:
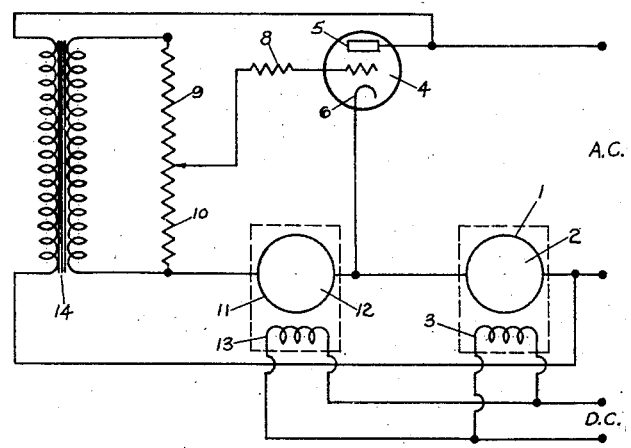
Figure 3:
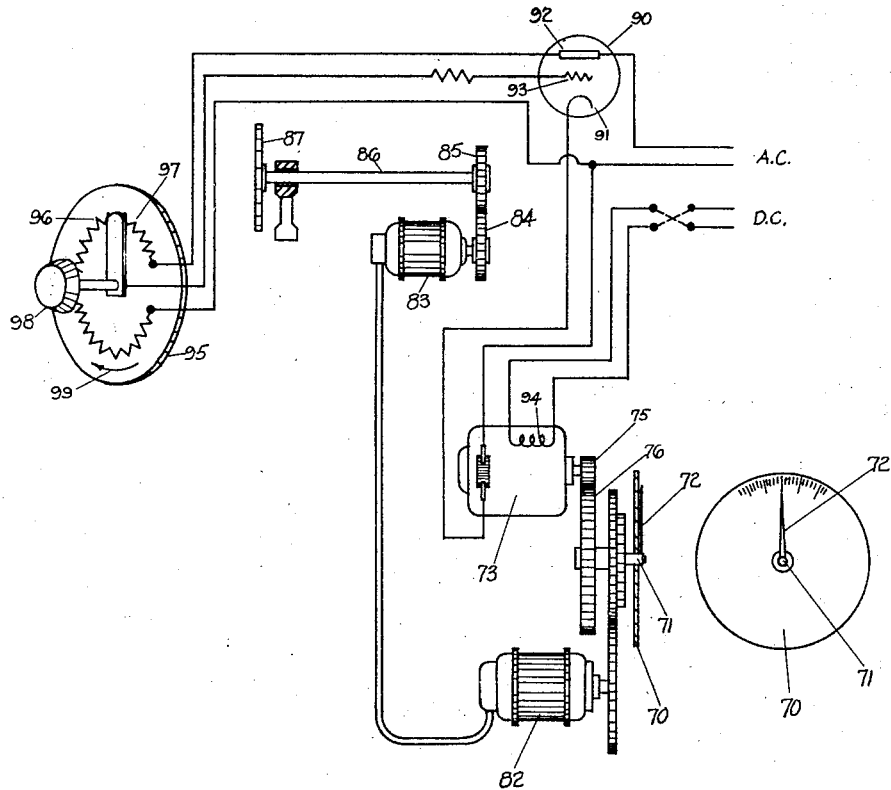

In the accompanying drawings Fig. 1 is a schematic wiring diaphragm of my invention while Fig. 2 shows a modification thereof, and Fig. 3 shows a schematic arrangement illustrating the application of the system for rotating a remotely positioned indicating pointer.

In the drawings the motor to be controlled is indicated at 1 and is provided with an armature 2 immersed in a continuous magnetic field which may be provided by a permanent magnet or by an electromagnet having winding 3 connected to a source of direct current as shown. A grid-controlled rectifier 4 has its anode 5 connected to one terminal of a source of alternating potential, the other terminal of which is connected to the armature 2 and thence to the cathode 6 of the rectifier tube. The grid 7 of the tube is connected through a current-limiting resistor 8 to the movable contact 9 of a potentiometer 10 whose extremities are connected across the same alternating potential source which supplies the anode circuit of the rectifier. It will be noted that the grid circuit of the rectifier includes in series the potential drop across the potentiometer 10 from the contact 9 to its lower extremity plus the back E. M. F. of the motor armature 2.

When the alternating potential source impresses an instantaneous positive potential upon the anode 5 with respect to the cathode 6, the potential of the grid 7 will also be positive with respect to the cathode 6 when the motor is at rest. Therefore, current will flow through the tube and through the armature of the motor which, therefore, will commence to revolve. Current impulses will thus pass through the armature in each half cycle of the alternating potential supply in which the anode 5 is positive with respect to the cathode. However, as the motor speed increases, the back E. M. F. generated by the armature 2 also increases and opposes the instantaneous positive potential applied to the grid from the potentiometer 10. When the motor speed is such that the armature's back E. M. F. is substantially equal to the potential of the potentiometer 10 as determined by the position of the contact 9, the rectifier 4 will no longer pass current. This condition will continue to exist for one or more cycles until the motor speed drops sufficiently so that the instantaneous grid potential during the positive half cycles of anode potential will be sufficiently positive to start conduction through the tube. If the contact 9 be moved toward the lower extremity of the potentiometer 10, the motor will run at a lower speed, and vice versa.

In the modification shown in Fig. 1, the back E. M. F. of the motor is used to control its speed and I prefer to use this arrangement. However, if desired, the modified arrangement shown in Fig. 2 may be employed. In this modification the armature 2 of the motor 1 is not connected in the grid circuit of the rectifier 4 but a pilot generator 11 is provided. The latter has an armature 12 immersed in a continuous magnetic field produced by permanent magnets or by an electromagnet having the winding 13 connected to a source of direct current as shown. The armature 12 of the pilot generator is connected in the grid circuit in series with a portion of the potentiometer 10. The voltage thereby introduced into the grid circuit of the rectifier will vary in proportion to the speed of the motor 2 and thereby bring about a limitation of the motor speed in a manner similar to that described with reference to Fig. 1. However, instead of connecting the potentiometer 10 directly across the alternating current source, it is connected across the secondary of the transformer 14 whose primary is connected directly across the alternating current source. This is necessary in order to isolate the pilot generator from the motor circuit.

In Fig. 3 there is shown an example of the application of the system for the control of the speed of rotation and/or the position of a remotely located device such as the pointer 72 which is fixed to a shaft 71 driven by the motor 73 through the reducing gears 75 and 76. A scale 70 is positioned in back of the pointer. The gears are indicated schematically as step-down gears 75, 76 and may, in fact, be replaced by any type reduction gear suitable for driving the system. The motor 73 corresponds to the motor 1 of Fig. 1. This motor is controlled by the motor-control mechanism including the thermionic tube 90 having cathode 91, anode 92 and control grid 93, corresponding to the tube 4 in Fig. 1 with cathode, anode and control grids.

The circuit indicated in Fig. 3 is similar to to that shown in Fig. 1. The field 94 of the motor 73 is energized by direct current and the armature of the motor 73 has one terminal connected to the alternating current source and the other to the cathode 91. The speed control is effected as previously described through the control of the potential on the grid 93 corresponding to the grid 7 of Fig. 1. This potential is directly controlled by means of a potentiometer 95 which is composed of the resistance 96 connected across the alternating current terminals and an adjustable tap 97 adjusted through the rheostat handle 98. The adjustable tap 97 is shown in the figure in a position to drive the motor at a speed considerably above the lowest speed available. When it is desired to rotate the motor faster, this tap is rotated in a clockwise direction as indicated by the arrow 99. This increases the speed with which the pointer 72 is turned by increasing the speed of the motor 73 and makes it possible to drive the pointer slowly or rapidly. The position of the pointer 72 is indicated by means of the self-synchronous motors 82 and 83, the motor 83 driving the indicator shaft 86 through the pair of gears 84 and 85. The indicator mounted on the shaft is shown at 87. The operator can in this manner determine at any moment the orientation of the pointer.

It will be understood that while Fig. 3 shows the application of my invention to a system for positioning a remotely located pointer, a similar arrangement can be used for positioning or rotating any device in place of the pointer 72.

Having now described my invention, I claim:

1. System for controlling the speed of a motor having an armature immersed in a continuous magnetic field comprising a grid-controlled rectifier having anode, cathode and grid electrodes, means for connecting said anode to one terminal of a source of alternating potential, means for connecting said cathode in series with the armature of said motor to the second terminal of said source of potential, a potentiometer having a movable contact, means for connecting the potentiometer across said source of alternating potential and means for connecting said grid to said movable contact.

2. System for controlling the speed of a motor having an armature immersed in a continuous magnetic field comprising a grid controlled rectifier having anode, cathode and grid electrodes, means for connecting said anode to one terminal of a source of alternating potential, means for connecting said cathode in series with the armature of said motor to the second terminal of said source of potential, a direct current generator having its armature mechanically connected to the armature of said motor whereby said generator generates a direct potential proportional to the motor's speed, means connected across said source of alternating potential for producing an alternating potential having a maximum value substantially equal to the maximum of said generated potential, a potentiometer having a movable contact, means for connecting the potentiometer across said last-named alternating potential-producing means, means for connecting said grid to said movable contact and means for connecting one terminal of said potentiometer to said cathode in series with said generator in the polarity with the positive side of the generator connected to the anode and the negative side to the potentiometer.

3. A variable speed control system for a motor having an armature immersed in a continuous magnetic field comprising a grid-controlled rectifier of the gaseous discharge type having its anode-cathode circuit supplied from a source of alternating potential and containing in a series relation the said armature, means for applying to the grid of said rectifier an alternating potential derived from the said source of anode potential and of substantially the same wave form as the latter, means for generating a direct potential proportional in magnitude to the motor's speed, means for varying the magnitude of said applied grid potential throughout the range from substantially zero to the maximum of said generated potential, and means for vectorially adding the generated potential to the applied potential in a polarity opposed to the positive half waves of the applied potential at the grid to form a resultant potential for the control of the grid.

4. A variable speed control system for a motor having an armature immersed in a continuous magnetic field comprising a half-wave grid-controlled rectifier of the gaseous discharge type having its anode-cathode circuit supplied from a source of alternating potential and containing in a series relation the said armature, said armature generating a direct back electromotive force proportional to its speed, means for applying to the grid of said rectifier an alternating potential derived from said source of anode potential and of substantially the same wave form as the latter, means for varying the magnitude of said applied grid potential throughout the range from substantially zero to the maximum of said back electromotive force and means for vectorially adding the back electromotive force to the applied potential in a polarity opposed to the positive half waves of the applied potential at the grid to form a resultant potential for the control of the grid.

HOWARD A. SATTERLEE.